US006957288B2

(12) United States Patent
Metevier et al.

(10) Patent No.: US 6,957,288 B2
(45) Date of Patent: Oct. 18, 2005

(54) EMBEDDED CONTROL AND MONITORING OF HARD DISK DRIVES IN AN INFORMATION HANDLING SYSTEM

(75) Inventors: Joyce Metevier, Round Rock, TX (US); Ahsan Habib, Pflugerville, TX (US); Arnold T. Schnell, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 10/368,764

(22) Filed: Feb. 19, 2003

(65) Prior Publication Data

US 2004/0177182 A1    Sep. 9, 2004

(51) Int. Cl.[7] ............................................. G06F 13/00
(52) U.S. Cl. ...................... 710/100; 710/301; 710/302; 710/305; 710/306
(58) Field of Search .............................. 710/100, 305, 710/301, 302, 306

(56) References Cited

U.S. PATENT DOCUMENTS

| 4,290,134 | A | 9/1981 | Hampshire ................. 370/92 |
| 4,355,385 | A | 10/1982 | Hampshire et al. ........... 370/85 |
| 6,327,511 | B1 | 12/2001 | Naismith et al. ............. 700/19 |
| 6,378,084 | B1 * | 4/2002 | Strunk et al. ................. 714/2 |
| 6,408,343 | B1 * | 6/2002 | Erickson et al. ............. 710/15 |
| 6,415,021 | B1 | 7/2002 | Oh ........................... 379/88.13 |
| 6,532,500 | B1 * | 3/2003 | Li et al. ...................... 710/15 |
| 6,542,951 | B1 | 4/2003 | Sangveraphunski et al. ..... 710/305 |
| 6,760,869 | B2 * | 7/2004 | Lam .......................... 714/42 |
| 2003/0005367 | A1 * | 1/2003 | Lam .......................... 714/42 |
| 2003/0023793 | A1 * | 1/2003 | Mantey et al. .............. 710/100 |
| 2003/0093721 | A1 * | 5/2003 | King et al. .................. 714/42 |
| 2003/0212857 | A1 * | 11/2003 | Pacheco et al. ............. 711/114 |
| 2004/0019821 | A1 * | 1/2004 | Chu et al. ...................... 714/6 |
| 2004/0088455 | A1 * | 5/2004 | Smith et al. ................. 710/72 |
| 2004/0162928 | A1 * | 8/2004 | Benson ..................... 710/301 |
| 2004/0177198 | A1 * | 9/2004 | Benson et al. ............. 710/301 |

FOREIGN PATENT DOCUMENTS

| KR | 2002031615 A * | 5/2002 | .......... G06F 13/10 |
| KR | 2002039045 A * | 5/2002 | .......... G06F 13/00 |

OTHER PUBLICATIONS

Wilson, Ron, "Cypress Enhances CPLD," Jul. 15, 1996, Electronic Engineering Times, p. 48.*
"SCSI Accessed Fault-Tolerant Enclosures Interface Specification," Apr. 14, 1997, nStor Corporation and Intel Corporation, p. 36.*
"The I2C-Bus Specification," Jan. 2000, Philips Semiconductors, Ver. 2.1, p. 1-46.*

* cited by examiner

*Primary Examiner*—Glenn A. Auve
*Assistant Examiner*—Donna K. Mason

(57) ABSTRACT

The need for a SAF-TE processor embedded on a SCSI backplane of a hot-swap hard disk drive enclosure is eliminated by utilizing the functionality of a RAID on motherboard (ROMB) controller and an Embedded Server Management (ESM) interface already present in an information handling system. Only sensors and input-output (I/O) registers remain on the SCSI backplane as required. The SCSI backplane I/O is split between the ESM and ROMB according to functional requirements.

18 Claims, 6 Drawing Sheets

EMBEDDED CONTROL AND MONITORING OF HARD DISK DRIVES IN AN INFORMATION HANDLING SYSTEM

BACKGROUND OF THE INVENTION TECHNOLOGY

1. Field of the Invention

The present invention is related to information handling systems, and more specifically, to embedded control and monitoring of hard disk drives in the information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Hot-swap SCSI disk drives may be used in RAID disk systems. These hot-swap SCSI disk drives are housed in a matching drive chassis or cage having a SCSI backplane (bus) which includes a SAF-TE (SCSI Accessed Fault Tolerant Enclosure) logic that provides an interface to the SCSI disk drives for the support of status signals, hot swapping drives, and enclosure monitoring. The SAF-TE protocol is an industry standard that allows the SCSI bus to be used for control and status purposes.

The SAF-TE interface provides this industry standard, non-proprietary way for third party disk and RAID controllers to be automatically integrated with peripheral packaging that supports status signals (LEDs, audible alarm, LCD, etc.), hot swapping of hard drives, and monitoring of enclosure components. From the system vendor's point of view, this allows quick integration of the best third party controllers, knowing that they will fully integrate with disk and peripheral packaging. It also allows a selected controller to work with a variety of expansion packaging, being fully able to sense status and drive enclosure indicators. The cost of a separate cable and interface for enclosure services is also eliminated.

SCSI is the underlying transport mechanism chosen for communicating enclosure information. This means that all standard SCSI host adapters will work. No special considerations, such as reserved signals on the SCSI bus, or additional cables are required. The SAF-TE Interface is implemented using a simple SCSI part and a microcontroller. The SAF-TE processor (SEP) device conforms to the ANSI SCSI-2 specification for processor devices.

The SAF-TE processor has two interfaces, SCSI and I$^2$C. The SAF-TE processor performs the SAF-TE target protocol entirely with its SCSI interface. A RAID on motherboard (ROMB) controller communicates with the SAF-TE processor to perform a number of operations. Since the SAF-TE processor is located on the SCSI backplane (bus), it also performs a number of embedded management functions, e.g., monitoring temperatures, voltage and fans, and reports that information to an Embedded Server Management (ESM) system via the I$^2$C interface.

When the SCSI backplane (bus) is split into two buses, for added speed, redundancy, etc., a second SAF-TE processor, commonly located on a SCSI daughtercard, must be added to the system backplane. Split SCSI backplane configurations separate the hard drives such that two separate SCSI channels may independently control the hard drives. However, since the SAF-TE protocol must be run on each SCSI bus, a separate SAF-TE processor is needed for each bus. Thus, the SCSI daughtercard serves this purpose in combination with the standard SAF-TE processor on the SCSI backplane.

The cost of a SAF-TE processor on the SCSI backplane is not trivial. The SAF-TE processor also occupies backplane board space and restricts airflow ventilation through the SCSI backplane. Since the information handling systems are becoming more dense and total power consumption increases, any improvements in reducing power consumption, increasing airflow ventilation and/or reducing costs are very beneficial.

SUMMARY OF THE INVENTION

The present invention remedies the shortcomings of the prior art by providing a method, system and apparatus for providing the functionality of a SAF-TE processor embedded on the SCSI backplane and also eliminates the need for SCSI daughtercards by utilizing functionality of the RAID (ROMB) controller and the Embedded Server Management (ESM) system already present in the information handling system. Remaining on the SCSI backplane are only sensors and input-output (I/O) registers as required. The I/O may be split between the ESM and ROMB according to functional requirements. The prior art SAF-TE processor functionality may be reassigned to the ESM and ROMB. For example, the ROMB may obtain information directly from the hard drives, e.g., revision number, vendor ID, etc. The ROMB performs SCSI bus scans to detect hard drives during power-up of the information handling system. During power-up the ROMB enables power to all disk drive slots then removes power to empty slots after performing the SCSI bus scans.

The ROMB may also obtain limited environmental sensor data from the SCSI backplane and/or housing. Typically however, the ESM handles the environmental data. Disk drive slot status, e.g., disk drive presence, drive inserted, slot ready for insertion/removal of disk, slot operational, may be obtained by the ROMB by reading status bits over a serial channel between the ROMB and the SCSI backplane. The ROMB may write light emitting diode (LED) status, e.g., to drive LED blink patterns, to the SCSI backplane via the serial channel therebetween. The ROMB may also perform disk drive control, e.g., prepare for operation, insertion/ removal and identify, by sending information to the SCSI backplane, via the serial channel, for the appropriate LED blink patterns.

The ESM may support temperature/voltage warnings and errors from sensors sending their readings over, for example but not limited to, an I²C bus. The ESM may also read disk drive failure/OK status, e.g., general health of the disk drive, via the I²C bus. In addition, the ESM may receive SCSI cabling errors from, for example but not limited to, a SCSI daughtercard indicating that a correct disk system configuration exists.

In an exemplary embodiment of the present invention, an information handling system has a ROMB and ESM interface in combination with operating management software, e.g., Embedded Server Management (ESM) software. A common way for ESM software to detect status information is for it to access the I²C bus(es) of the information handling system, and periodically poll these buses for the desired status information. The I²C bus specification, version 2.1, January 2000, is available from Philips Semiconductors, and is incorporated by reference herein. It is contemplated and within the scope of the present invention that any type of input interface hardware and protocols may be used in the present invention, so long as a desired status input may be recognized by the information handling system input devices and thereby read by the ROMB and ESM interface for processing thereof.

In this exemplary embodiment, the SCSI backplane comprises a complex programmable logic device (CPLD) having at least two I²C interfaces and provides control signals for external components, e.g., hard disk drive power field effect transistors (FETs). In the addition, the CPLD may also be adapted to support secondary backplanes, e.g., 1×2 backplanes in peripheral bays. The ROMB controls hard disk drive power and the status, and indicator LEDs. The ROMB also may provide status to the ESM interface. The ESM interface is coupled to the sensors via an I²C bus and may have read-only access to the CPLD.

In another exemplary embodiment of the present invention, external RAID cards may be supported with a daughtercard having a SAF-TE processor, e.g., an external RAID card controlling a split backplane.

A technical advantage of the present invention is providing the functionality of a SAF-TE interface without the cost and complexity of adding another processor. Another technical advantage is providing SAF-TE functionality by using the existing ROMB and ESM in combination with a SCSI backplane, and serial and I²C interfaces therebetween.

BRIEF DESCRIPTION OF THE DRAWINGS

A more complete understanding of the present disclosure and advantages thereof may be acquired by referring to the following description taken in conjunction with the accompanying drawings wherein.

Figure 1:
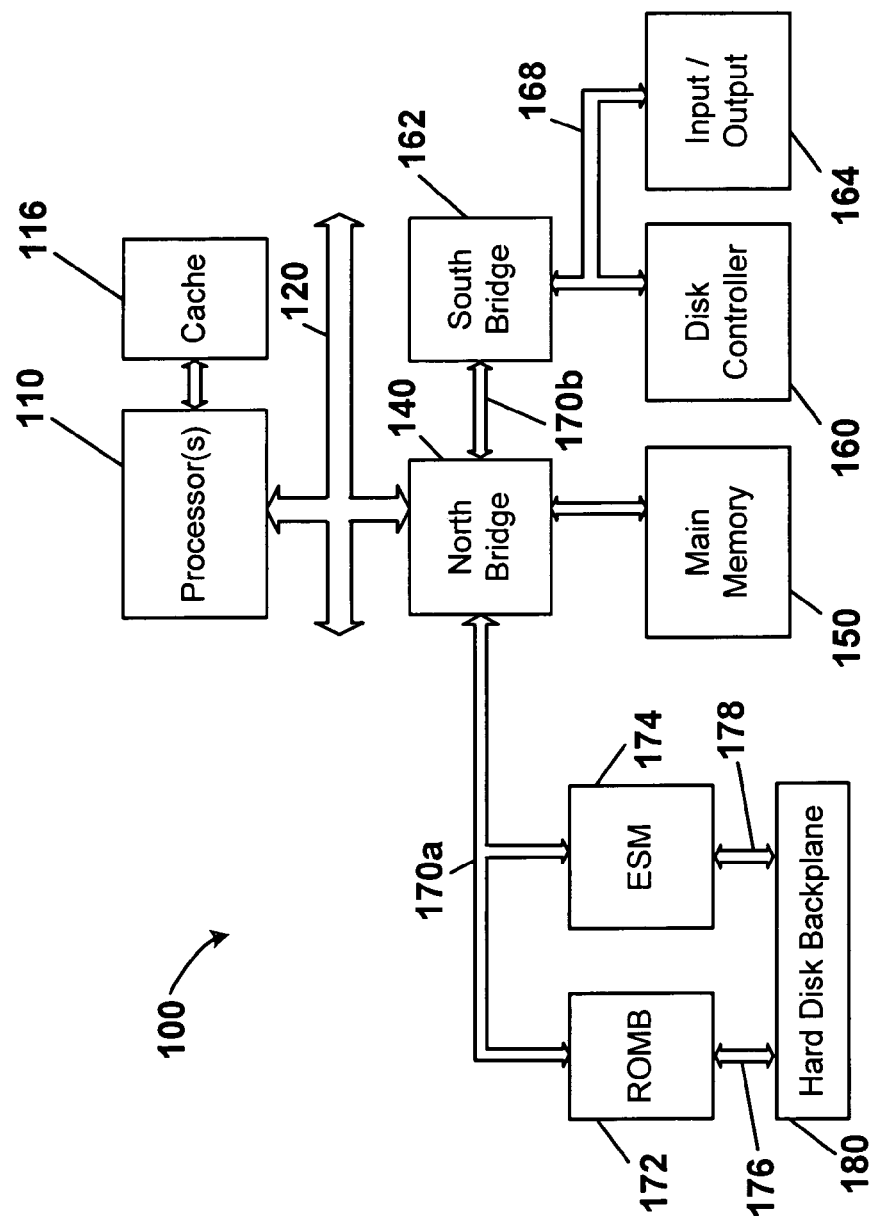
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) and communicating data and control signals therebetween over signal buses. In one embodiment, the information handling system is a computer system. The information handling system, generally referenced by the numeral 100, comprises a processor(s) 110 coupled to a host bus(es) 120 and a cache memory 116. A north bridge(s) 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI buses 170a and 170b, AGP bus coupled to graphics display (not shown), etc. The second bus may also comprise other industry standard buses or proprietary buses, e.g., ISA, SCSI, USB buses 168 through a south bridge (bus interface) 162. These secondary buses 168 may have their own interfaces and controllers, e.g., ATA disk controller 160 and input/output interface(s) 164.

In the information handling system 100, according to the present invention, embedded controllers, e.g., a RAID on motherboard (ROMB) controller 172 and a Embedded Server Management (ESM) interface 174 may be coupled to PCI bus 170a. The ROMB controller 172 is coupled to a removable hard disk backplane 180 through a SCSI interface 176, and the ESM interface 174 is coupled to the backplane 180 through an I$^2$C interface 178.

Figure 2:
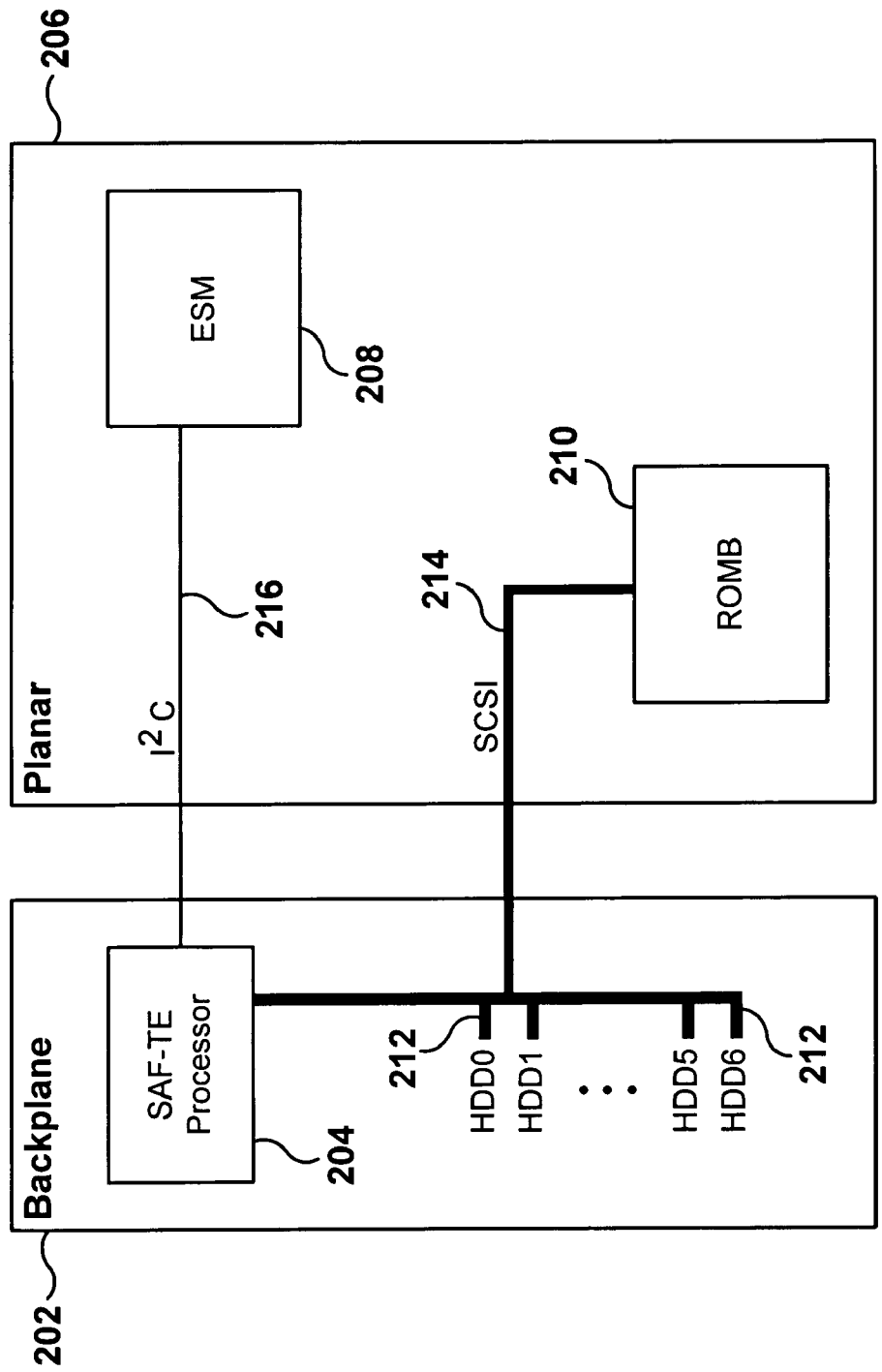
FIG. 2 is a schematic block diagram of a prior art SAF-TE system.

Referring to FIG. 2, depicted is a schematic block diagram of a prior art SAF-TE system. An ESM interface 208 and a ROMB 210 are located on a motherboard 206 of an information handling system (not shown). A hot-swap SCSI hard disk backplane 202 has a SAF-TE processor 204 located thereon. In addition, hot-swap SCSI connectors 212 are adapted to receive the removable hot-swap SCSI hard disk drives (not shown). The SCSI connectors 212 are coupled to the ROMB 210 over a SCSI bus 214. The ESM interface 208 is coupled to the SAF-TE processor 204 over an I$^2$C bus 216. The SAF-TE processor 204 performs a SAF-TE target protocol entirely with its SCSI interface over the SCSI bus 214. The ROMB 210 communicates requested operations to the SAF-TE processor 204. The SAF-TE processor 204 thereby performs the requested operations with the hard disk drives (not shown). Since the SAF-TE processor 204 is located on the SCSI hard disk backplane 202, the SAF-TE processor 204 also performs a number of embedded management functions, such as monitoring temperatures, voltages and fan status, and reports this information to the ESM 208 via the I$^2$C bus 216.

Figure 3:
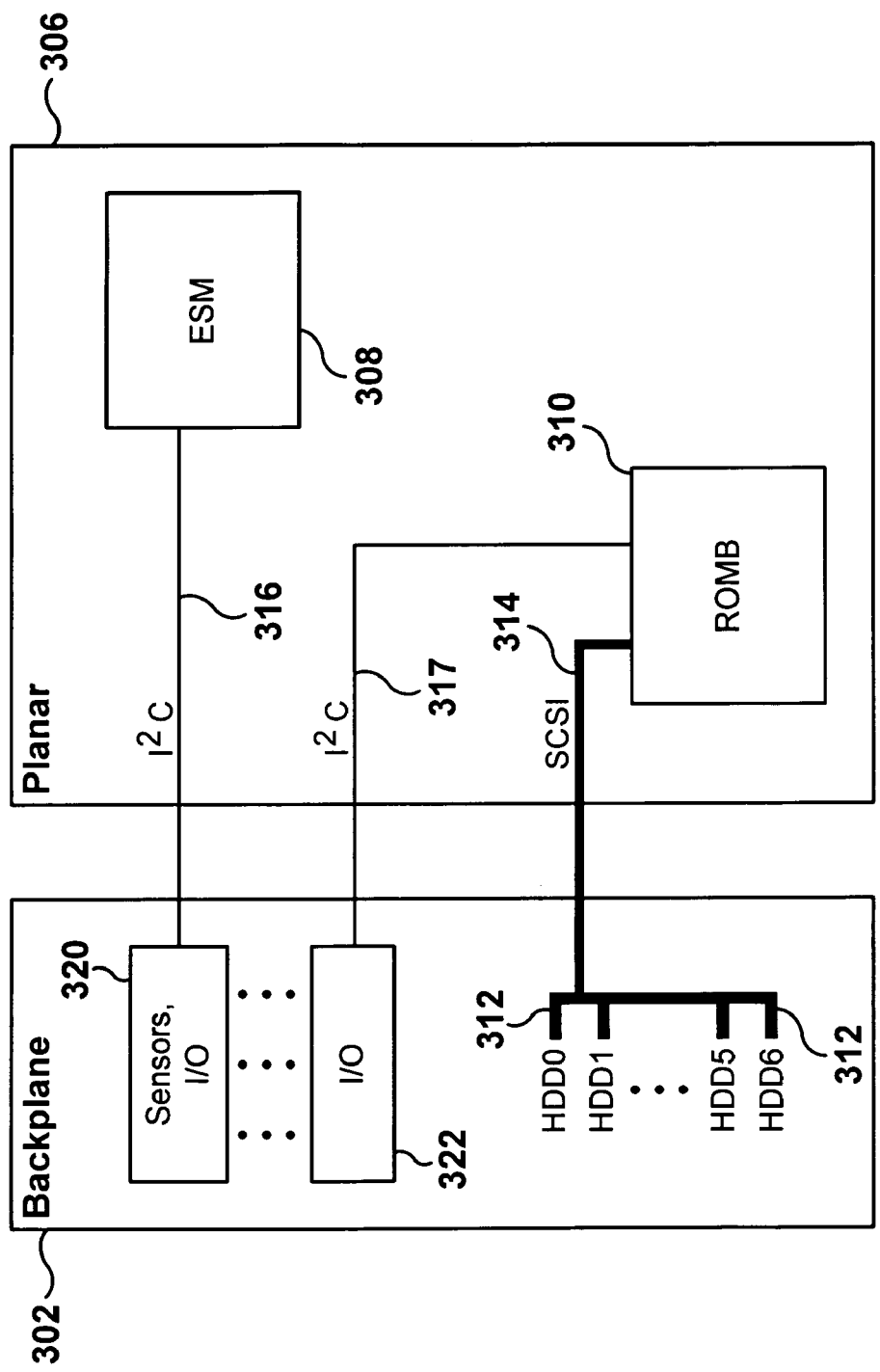
FIG. 3 is a schematic block diagram of a SAF-TE system of an information handling system, according to an exemplary embodiment of the present invention.

Referring to FIG. 3, depicted is a schematic block diagram of a SAF-TE system of the information handling system 100 of FIG. 1. An ESM interface 308 and a ROMB 310 are located on a motherboard 306 of an information handling system 100 (FIG. 1). A hot-swap SCSI hard disk backplane 302 has sensors 320 and an input-output (I/O) interface 322 located thereon. In addition, hot-swap SCSI connectors 212 are adapted to receive the removable hot-swap SCSI hard disk drives (not shown). The SCSI connectors 312 are coupled to the ROMB 310 over a SCSI bus 314. The ESM interface 308 is coupled to the sensors 320 over an I$^2$C bus 316. The ROMB 310 is also coupled to the I/O interface 322 over an I$^2$C bus 317.

Figure 4:
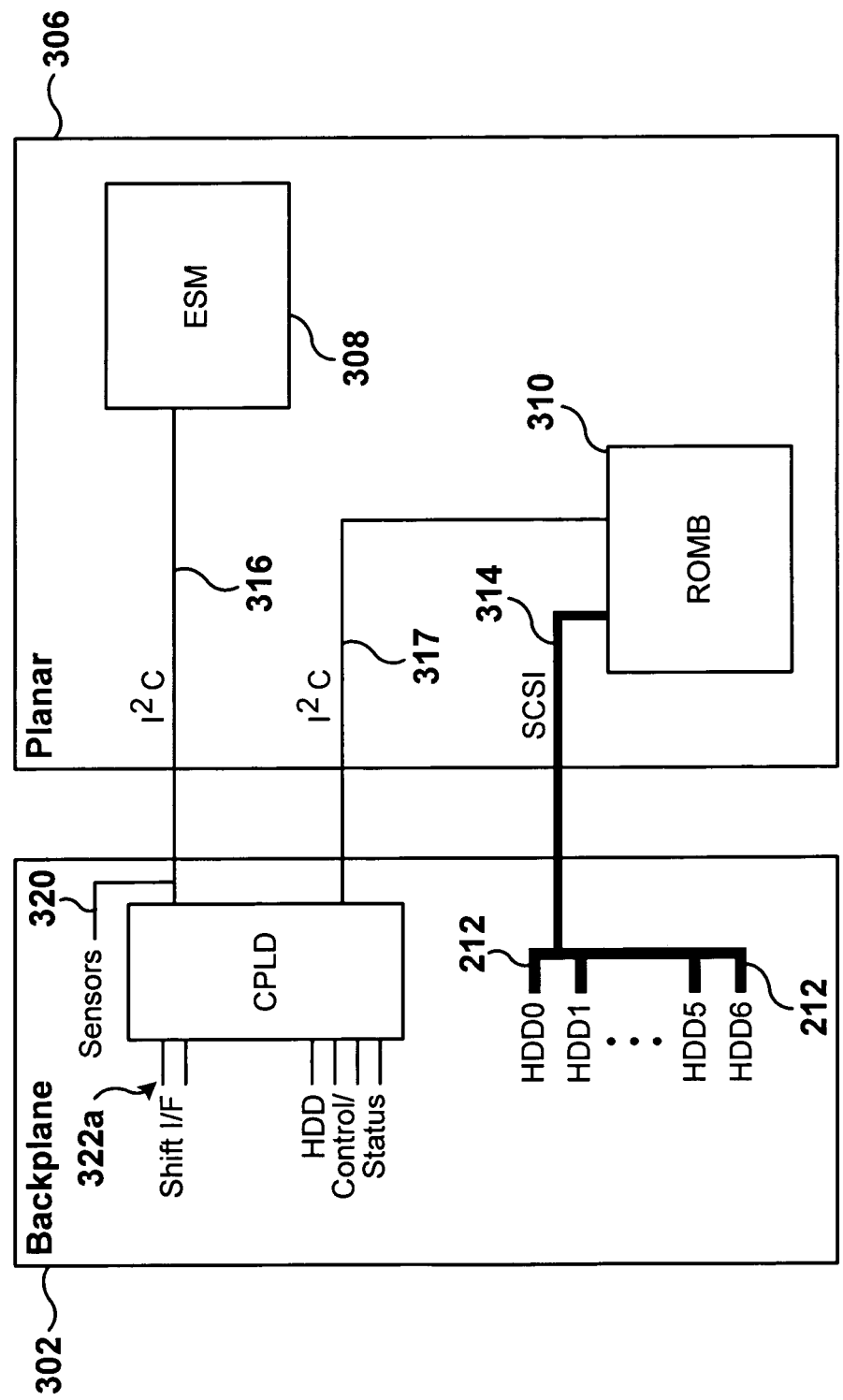
FIG. 4 is a schematic block diagram of a CPLD used as I/O status and control on a SCSI backplane coupled to the ESM and ROMB depicted in FIG. 3.

Referring to FIG. 4, depicted is a schematic block diagram of a complex programmable logic device (CPLD) used as an I/O status and control interface on a SCSI backplane coupled to the ESM and ROMB of FIG. 3. The CPLD interface 322a may be used to perform output functions in accordance with commands sent to it by the ROMB 310 over the I$^2$C bus 317. The CPLD interface 322a also sends status information to the ROMB 310 over the I$^2$C bus 317 and to the ESM interface 308 over the I$^2$C bus 316.

Figure 5:
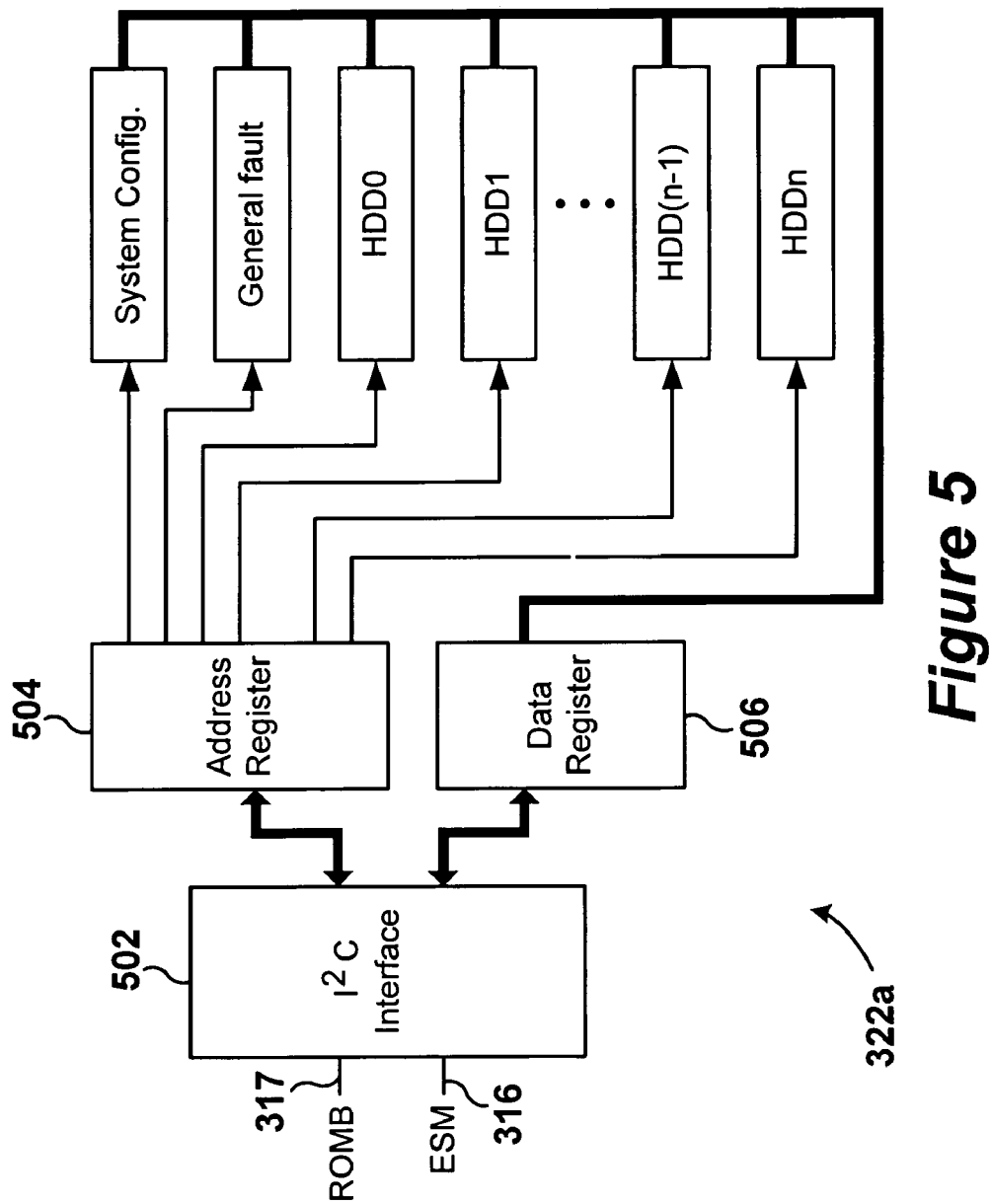
FIG. 5 is a more detailed schematic block diagram of the CPLD interface depicted in FIG. 4.

Referring to FIG. 5, depicted is a more detailed schematic block diagram of the CPLD interface 322a of FIG. 4. The CPLD interface 322a comprises two I$^2$C bus interfaces, one coupled to the I$^2$C bus 316 and the other coupled to the I$^2$C bus 317, an address register 504 coupled to various input-output functions and removable hard disk drives, and a data register 506 coupled to the removable hard disk drives and the various input-output functions.

Figure 6:
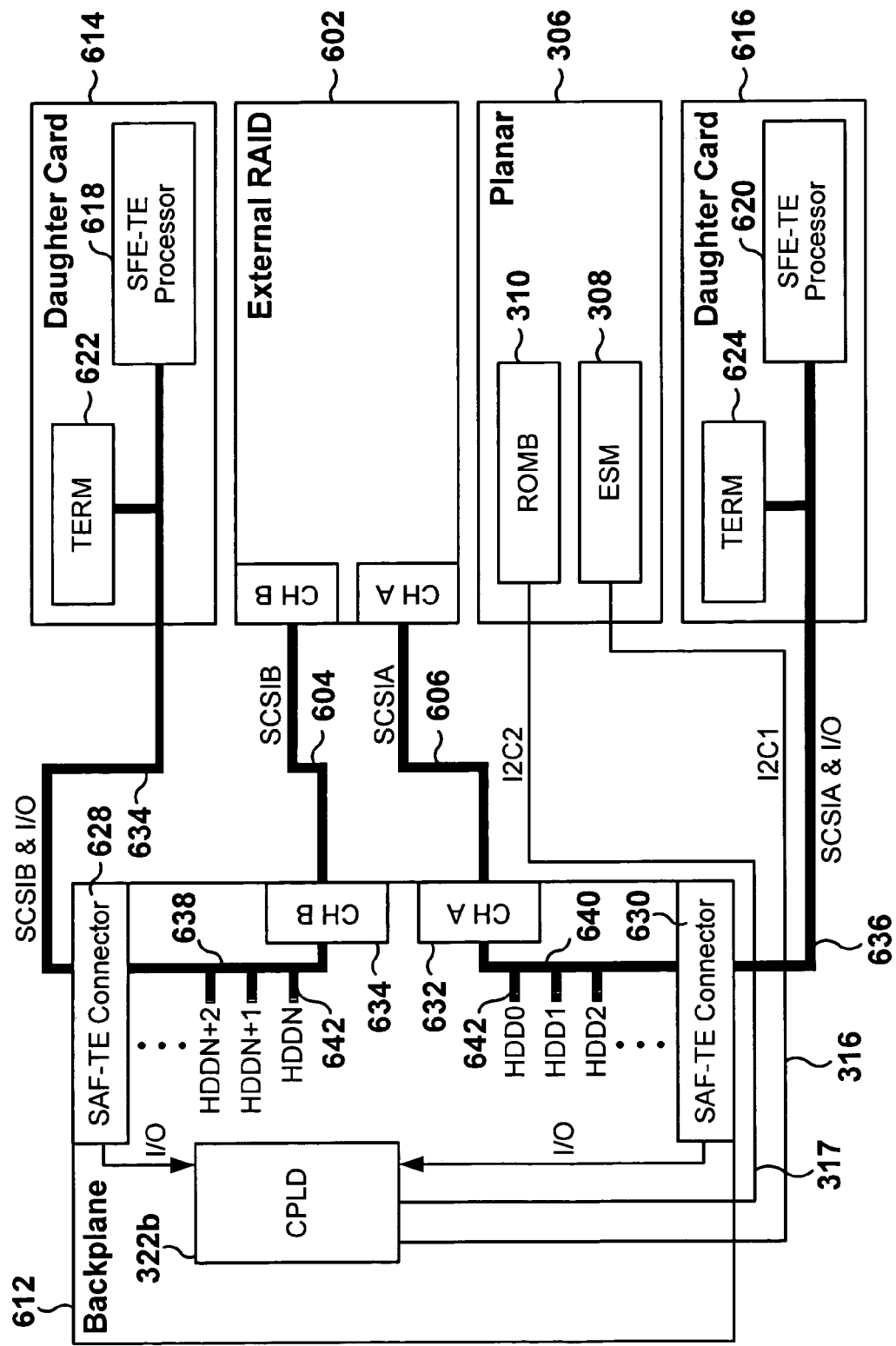
FIG. 6 is a schematic block diagram of a dual channel external RAID system, according to another exemplary embodiment of the present invention.

Referring to FIG. 6, depicted is a schematic block diagram of a dual channel external RAID system, according to another exemplary embodiment of the present invention. An ESM interface 308 and a ROMB 310 are located on a motherboard 306 of a dual channel RAID information handling system (similar to system 100 of FIG. 1).

A hot-swap SCSI hard disk backplane 612 has a CPLD 322b used as an I/O status and control interface, a first SAF-TE connector 628, a second SAF-TE connector 630, SCSI channel A connector 632 and SCSI channel B connector 634. An external RAID system 602 may be coupled to the backplane 612 wherein channel A of the external RAID system 602 is coupled to the SAF-TE connector 630 through the SCSI A connector 632, and channel B of the external RAID system 602 is coupled to the SAF-TE connector 628 through the SCSI B connector 634.

The ROMB 310 is coupled to the CPLD 322b through I$^2$C bus 317 and the ESM 308 is coupled to the CPLD 322b through I$^2$C bus 316. A first daughtercard 614 has a SAF-TE processor 618 and a SCSI bus terminator 622. A second daughtercard 616 has a SAF-TE processor 620 and a SCSI bus terminator 624. The second daughter card 616 controls the operation of SCSI channel A, and the first daughter card 614 controls the operation of SCSI channel B. As in the above exemplary examples, the hot-swap SCSI connectors are adapted to receive the removable hot-swap SCSI hard disk drives (not shown). The SCSI hard disk drive connectors 642 are grouped into channels A and B and are coupled to the respective SAF-TE processors 618 and 620 over buses 638 and 640, respectively.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having at least one small computer system interface (SCSI) disk drive, said system comprising:
 a motherboard;
 an embedded server management (ESM) interface coupled to a first serial communications bus, said ESM interface attached to and in electrical communication with said motherboard;
 a redundant array of independent disks (RAID) on motherboard (ROMB) controller coupled to a second serial communications bus, said ROMB attached to and in electrical communication with said motherboard;
 a SCSI accessed fault tolerant enclosure (SAF-TE) backplane having sensors, an input-output (I/O) interface and at least one SCSI connector, wherein the sensors are coupled to the I/O interface and the first and second serial communications buses are coupled to the I/O interface; and at least one SCSI disk drive coupled to the at least one SCSI connector.

2. The information handling system according to claim 1, wherein said SAF-TE backplane is adapted to receive hot-swap SCSI disk drives and the at least one SCSI disk drive is a hot-swap SCSI disk drive.

3. The information handling system according to claim 1, wherein the first serial communications bus is an Inter-IC ($I^2C$) bus.

4. The information handling system according to claim 1, wherein the second serial communications bus is an $I^2C$ bus.

5. The information handling system according to claim 1, wherein the ESM interface is coupled to the sensors and the I/O interface through the first serial communications bus and the ROMB controller is coupled to the I/O interface through the second serial communications bus.

6. The information handling system according to claim 1, wherein the ROMB controller is coupled to the at least one SCSI connector with a SCSI bus.

7. The information handling system according to claim 1, wherein the I/O interface is a complex programmable logic device (CPLD).

8. The information handling system according to claim 1, wherein the sensors are selected from the group consisting of voltage, temperature and fan operation.

9. The information handling system according to claim 1, wherein the ROMB controller receives status selected from the group consisting of disk drive slot status, disk drive presence, disk drive inserted, slot ready for insertion/removal of disk, and slot operational.

10. The information handling system according to claim 1, wherein the ROMB controller controls operations selected from the group consisting of driving light emitting diode (LED) blink patterns, preparing disk drive for operation, and indication for insertion/removal of disk drive.

11. The information handling system according to claim 1, wherein the ESM interface receives information from the sensors selected from the group consisting of temperature, voltage, disk drive failure, disk drive operational, and SCSI cabling errors.

12. The information handling system according to claim 1, further comprising a daughtercard having a SAF-TE processor attached to and in electrical communication with said daughtercard, wherein the daughtercard and SAF-TE processor are coupled to said SAF-TE backplane.

13. The information handling system according to claim 12, further comprising an external RAID system coupled to said SAF-TE backplane and the SAF-TE processor.

14. The information handling system according to claim 1, further comprising a plurality of daughtercards, each of said plurality of daughtercards having a SAF-TE processor attached to and in electrical communication therewith, wherein each of said plurality of daughtercards and the SAF-TE processors are coupled to said SAF-TE backplane.

15. The information handling system according to claim 14, further comprising an external RAID system coupled to said SAF-TE backplane.

16. The information handling system according to claim 15, wherein said external RAID system comprises at least two SCSI channels.

17. The information handling system according to claim 16, wherein each of the at least two SCSI channels are coupled to respective ones of said plurality of daughtercards and the SAF-TE processors.

18. The information handling system according to claim 1, wherein said motherboard is a computer motherboard.

* * * * *